US008938495B2

United States Patent
Lee et al.

(10) Patent No.: US 8,938,495 B2
(45) Date of Patent: Jan. 20, 2015

(54) REMOTE MANAGEMENT SYSTEM WITH ADAPTIVE SESSION MANAGEMENT MECHANISM

(71) Applicant: Industrial Technology Research Institute, Hsinchu (TW)

(72) Inventors: Kuen-Min Lee, Tainan (TW); Jin-Neng Wu, Tainan (TW); Ping-Yu Chen, Tainan (TW); Yu-Chang Chao, Chiayi County (TW)

(73) Assignee: Industrial Technology Research Insitute, Hsinchu (TW)

( * ) Notice: Subject to any disclaimer, the term of this patent is extended or adjusted under 35 U.S.C. 154(b) by 205 days.

(21) Appl. No.: 13/796,235

(22) Filed: Mar. 12, 2013

(65) Prior Publication Data
US 2014/0122574 A1    May 1, 2014

(30) Foreign Application Priority Data

Nov. 1, 2012 (TW) .............................. 101140548 A

(51) Int. Cl.
*G06F 15/16* (2006.01)
*H04L 29/06* (2006.01)

(52) U.S. Cl.
CPC ..................................... *H04L 67/42* (2013.01)
USPC ........... 709/203; 718/101; 718/102; 718/104; 718/105

(58) Field of Classification Search
CPC ..... H04L 45/02; H04L 45/028; H04L 45/125; H04L 69/24; H04L 69/18; H04L 67/02; G06F 11/2097; G06F 11/2025; G06F 11/2035
USPC ......................................................... 709/203
See application file for complete search history.

(56) References Cited

U.S. PATENT DOCUMENTS

| 6,820,085 | B2 | 11/2004 | Nishizawa et al. |
| 7,111,291 | B2 | 9/2006 | Loy et al. |
| 7,725,603 | B1* | 5/2010 | Kanevsky et al. ............ 709/245 |
| 7,761,431 | B2 | 7/2010 | Blea et al. |
| 7,801,997 | B2 | 9/2010 | Kalmuk et al. |
| 7,945,677 | B2 | 5/2011 | Fleischer et al. |

(Continued)

OTHER PUBLICATIONS

Poggi, et al., "Self-adaptive utility-based web session management," Computer Networks, , vol. 53, Issue 10, pp. 1712-1721, Jul. 14, 2009.

(Continued)

*Primary Examiner* — Tauqir Hussain
(74) *Attorney, Agent, or Firm* — Rabin & Berdo, P.C.

(57) ABSTRACT

A remote management system with adaptive management mechanism is disclosed, by using an adaptive feedback session management decision (AFSMD) server to connect a plurality of clients and a plurality of cluster nodes respectively. AFSMD server includes a session ID map manager for recording mapping between session and cluster node forwarded to; a decision grade producer, for producing a decision grade to determine the session management manner required for the current session; a session connection number query (SCNQ) for communicating with a storage to obtain a total connection number of a client; a cluster node communication interface, for communicating with cluster nodes and for information cluster nodes if session needs duplication; and a session management decision controller for overseeing the entire session management decision flow to achieve higher efficiency.

26 Claims, 9 Drawing Sheets

(56) References Cited

U.S. PATENT DOCUMENTS

2007/0220302 A1* 9/2007 Cline et al. .................. 714/4
2007/0282951 A1* 12/2007 Selimis et al. ................ 709/205
2010/0153966 A1* 6/2010 Arimilli et al. ............... 718/105
2013/0263227 A1* 10/2013 Gongaware et al. .......... 726/4

OTHER PUBLICATIONS

Totok et al., "Modeling of concurrent web sessions with bounded inconsistency in shared data", Journal of Parallel and Distributed Computing, vol. 67, Issue 7, pp. 830-847, Jul. 2007.

Huynh et al., "Empirical observations on the session timeout threshold", Information Processing & Management, vol. 45, Issue 5, pp. 513-528, Sep. 2009.

Lufei et al., "Energy-aware QoS for application sessions across multiple protocol domains in mobile computing Original Research Article", Computer Networks, vol. 51, Issue 11, pp. 3125-3141, Aug. 8, 2007.

Sivaramakrishnan et al., "Efficient sessions", Science of Computer Programming, vol. 78, Issue 2, pp. 147-167, Feb. 1, 2013.

* cited by examiner

REMOTE MANAGEMENT SYSTEM WITH ADAPTIVE SESSION MANAGEMENT MECHANISM

CROSS-REFERENCE TO RELATED APPLICATION

The present application is based on, and claims priority form, Taiwan Patent Application No. 101140548, filed Nov. 1, 2012, the disclosure of which is herby incorporated by reference herein in its entirety.

TECHNICAL FIELD

The technical field generally relates to a remote management system with adaptive management mechanism.

BACKGROUND

As the wideband network becomes more ubiquitous, more network services are provided in the Internet, wherein the number and variety of web services are growing rapidly. In addition, more service providers are investigating to join the web service market. At present, the network services range from providing simple static information, such as, images and texts, to multimedia streaming and e-commerce. Web service is an important part for service provider to reach out to the mass consumers.

The conventional network service is often called stateless service. The stateless service refers to a one-direction flow of information, wherein the user visits a certain site and read or download related information, such as, documents, articles, news, images, and so on. Contrast to the stateless service, the contemporary service is often referred to as stateful service, or session-based service. The session-based service, on the other hand, is to generate response corresponding to the request of the user, such as, shopping, search engine, and so on. Therefore, for different requests, different contents will be generated by the website to the user based on the previous record of the user. When the website receives the request from the user or parameters provided by the user, the website generates corresponding result according to the request or the parameters. All the requests are in the form of a session-based service. On the other hand, the network Open System Interconnection (OSI) Reference Model clearly defines the session layer and its importance. The session layer is responsible for establishing network connection and terminating the connection when the data transmission is over. The operation can be understood by the metaphor of calling conference meeting (establishing connection), exchanging opinions (data transmission) and adjourning the conference meeting (terminating connection). Therefore, more and more web services operate based on the session layer, which leads to the increasing importance of the session management in the network services.

In addition, as telecommunication service grows rapidly in recent years, many telecommunication providers use remote network management to manage facilities remotely to save operation cost. For remote network management, the majority of the management protocols or application software is based on HTTP protocol. Therefore, the session management in HTTP protocol plays an important role in the remote management efficiency.

On the other hand, the session is also widely used in cluster computing management system. A cluster system may be formed in many ways. One of the most common ways is to adopt the architecture centered with a load balancer 102, as shown in FIG. 1. After load balancer 102 receives a client request from a client 101, load balancer 102 determines which cluster node 103 at the backend should be request be forwarded to based on the load balancing mechanism. After receiving the request, the designated cluster node 103 executes the request task and then replies the response to the client 101.

In the above scenario, the load balancing mechanism in the load balancer is to determine which backend cluster node should the client request be forwarded to so that the load among the backend cluster nodes can be balanced to take performance, throughput, utilization and related index into consideration. Therefore, the quality of the load balancing mechanism affects directly the efficiency of the system management.

The known load balancing mechanisms are roughly divided into two categories: static and dynamic. In static load balancing mechanism, the state of the backend cluster nodes, such as, the current load, data distribution in the disks, computation capability, and so on, is not considered when dispatching requests or tasks. Instead, the dispatching depends solely on the judgment of the load balancer. Therefore, the algorithms adopted by this category of mechanism mainly include round robin and random types. In dynamic load balancing mechanism, the state of the backend cluster nodes is taken into account when dispatching the requests and the tasks. Compared to static type, the dynamic load balancing mechanism is considered smarter because a better dispatching policy can be achieved for real time system resource when the state of the backend cluster nodes is taken into account. Load balancing mechanism of this category include: content-based, locality-aware request distribution, weighted round robin, least connection, adaptive mechanism, and so on. Regardless of the category, different load balancing mechanisms can be applied to different systems. However, mere improvement on the load balancing mechanism can only improve the overall efficiency of an entire cluster to a small extent.

To improve the efficiency of an entire cluster, the session-based management is an effective starting point as the session connection is the basic element in the cluster structure. Therefore, the fundamental improvement of the cluster efficiency can be achieved by the optimal session management policy for each session management according to the management environment. Currently, the session-based management mechanisms are categorized as: sticky session management mechanism and multi-point replication session management mechanism. The sticky session management mechanism has the characteristics of single point of failure. Without a mechanism of replicating session information to other cluster nodes, the entire session can be unable to continue when the node originally providing services unexpectedly becomes unable to continue providing service, such as, connection failure, because the entire session cannot be transferred to other nodes. In other words, this type of mechanism does not provide fault-recovery capability. The multi-point replication session management mechanism uses multicasting to replicate session information to other nodes. With a mechanism to repeatedly replicate session information to other nodes, a fail-over effect can be achieved. However, this type of mechanism greatly increases network load as well as management cost. Thus, it is imperative to devise an adaptive session management mechanism to effectively reduce the cost of network system, improve remote management efficiency so that the remote management is more convenient to facilitate industrial growth.

SUMMARY

The primary object of the present invention is to provide a remote management system with adaptive session management mechanism, using adaptive technique to generate suitable session management manner dynamically according to the management environment so that a dynamic management mechanism change is possible for each session, as well as using a self-learning mechanism to modify session management algorithm according to the state and number of the successful connections.

An exemplary embodiment of the present disclosure describes a remote management system with adaptive session management mechanism, through an adaptive feedback session management decision (AFSMD) server to connect one or more client terminals and one or more cluster nodes. The AFSMD server includes a session ID map manager, configured to record the mapping relation between sessions and the cluster nodes forwarded to; a decision grade producer, configured to produce a decision grade to determine a session management manner of a current session; a session connection number query (SCNQ), configured to communicate with a storage device and obtain a number of session connections of a client terminal; a cluster node communication interface, configured to detect whether all cluster nodes operating normally, communicate with cluster nodes, forward a connection from a client terminal to a cluster node based on a load-balancing rule and obtain a session identification (ID), and inform cluster nodes whether to replicate content of the current session; and a session management decision controller, connected to the session ID mapping manager, session decision grade producer, SCNQ and cluster mode communication interface, configured to control entire decision flow of the session management, including an adaptive session management decision algorithm to dynamically determine different session management manner according to a decision grade produced by the decision grade producer, and to record the number of successes and failures of each cluster nodes for modifying a decision grade factor so as to achieve efficient management manner.

Another embodiment of the present disclosure describes a method of adaptive session management, applicable to a session-based service system, the session-based service system including one or more client terminals and one or more cluster nodes. The method of adaptive session management includes the following steps: assigning an initial value to a failure factor of a cluster node; the system receiving a connection request from a client terminal and inspecting whether the connection request including a session ID data; determining a management manner for the session connection based on a pre-session session management decision algorithm before the session when no session ID data being included; executing an in-session session management decision algorithm to determine a management manner for subsequent session connections when session ID data being included; based on mapping session management manner in a session ID mapping manager, forwarding the connection request to corresponding cluster node for processing; and updating failure rate and failure factor of the cluster node, and continuing to receive a next connection request until all connection requests being over.

Another embodiment of the present disclosure describes a decision apparatus of adaptive feedback session management, able to connect at least a client terminal and at least a cluster node. The decision apparatus of adaptive feedback session management includes: a session ID map manager, configured to record the mapping relation between sessions and the cluster nodes forwarded to; a decision grade producer, configured to produce a decision grade to determine a session management manner of a current session; a session connection number query (SCNQ), configured to communicate with a storage device and obtain a number of session connections of a client terminal; a cluster node communication interface, configured to detect whether all cluster nodes operating normally, communicate with cluster nodes, forward a connection from a client terminal to a cluster node based on a loading balancing rule and obtain a session identification (ID), and inform cluster nodes whether to replicate content of the current session; and a session management decision controller, connected to the session ID mapping manager, session decision grade producer, SCNQ and cluster mode communication interface, configured to control entire decision flow of the session management, including an adaptive session management decision algorithm to dynamically determine different session management manner according to a decision grade produced by the decision grade producer, and to record the number of successes and failures of each cluster nodes for modifying a decision grade factor.

Another embodiment of the present disclosure describes a method of adaptive session management, applicable to a decision apparatus of adaptive feedback session management, the decision apparatus of adaptive feedback session management being connected to at least a client terminal and at least a cluster node. The method of adaptive session management includes the following steps: assigning an initial value to a failure factor of a cluster node; receiving a connection request from a client terminal and inspecting whether the connection request including a session ID data; determining a management manner for the session connection based on a pre-session session management decision algorithm before the session when no session ID data being included; executing an in-session session management decision algorithm to determine a management manner for subsequent session connections when session ID data being included; based on mapping session management manner in a session ID mapping manager, forwarding the connection request to corresponding cluster node for processing; and updating failure rate and failure factor of the cluster node, and continuing to receive a next connection request until all connection requests being over; wherein the at least a client terminal using the decision apparatus of adaptive feedback session management indirectly to establish connection with the at least one cluster node; the decision apparatus of adaptive feedback session management being configured to distributing connection request from the at least a client terminal to the at least one cluster node, and returning the execution result from the at least one cluster node to the at least a client terminal for performing session management.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
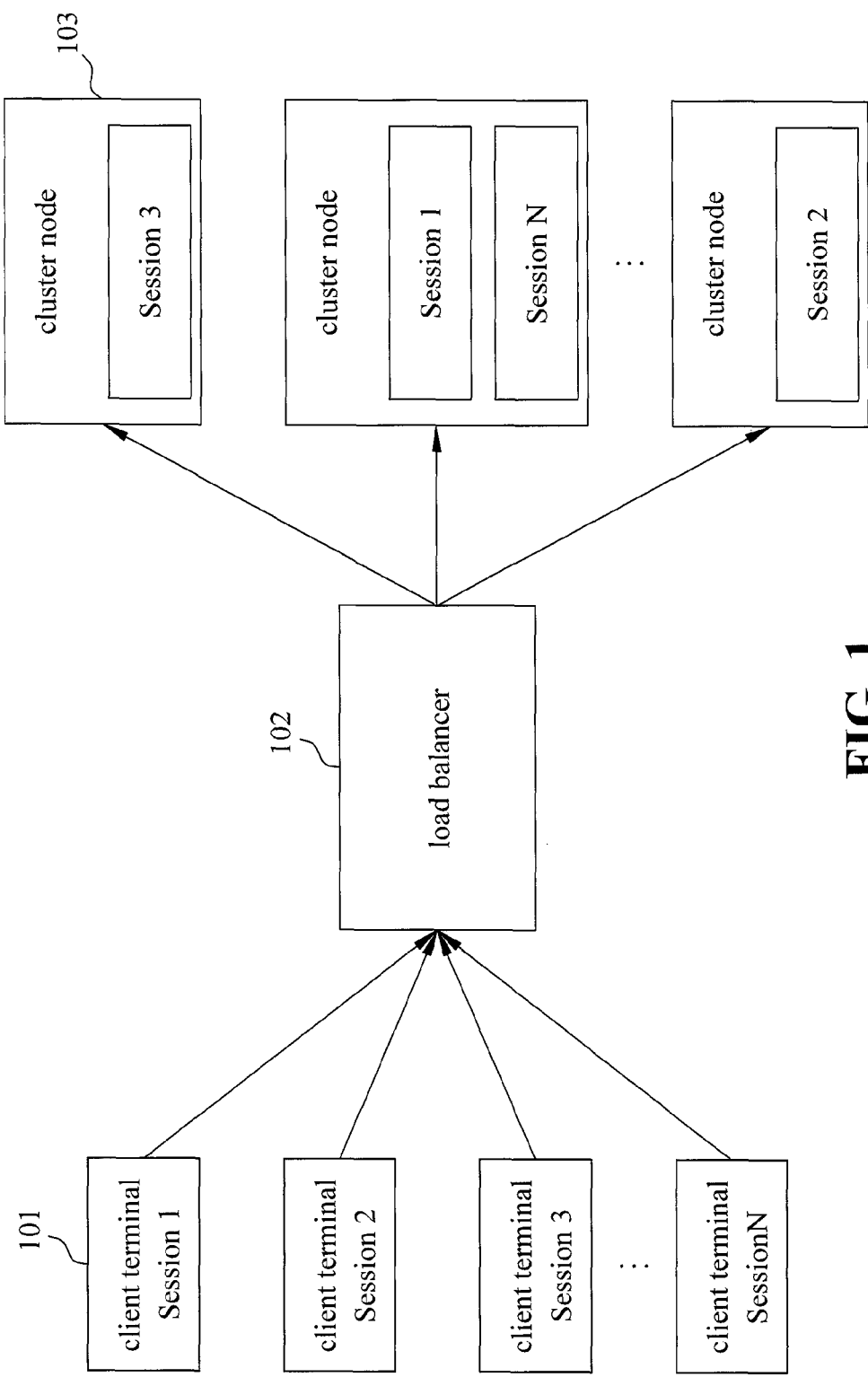
FIG. 1 shows a schematic view of the structure of a known cluster management system centered on a load-balancer server.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
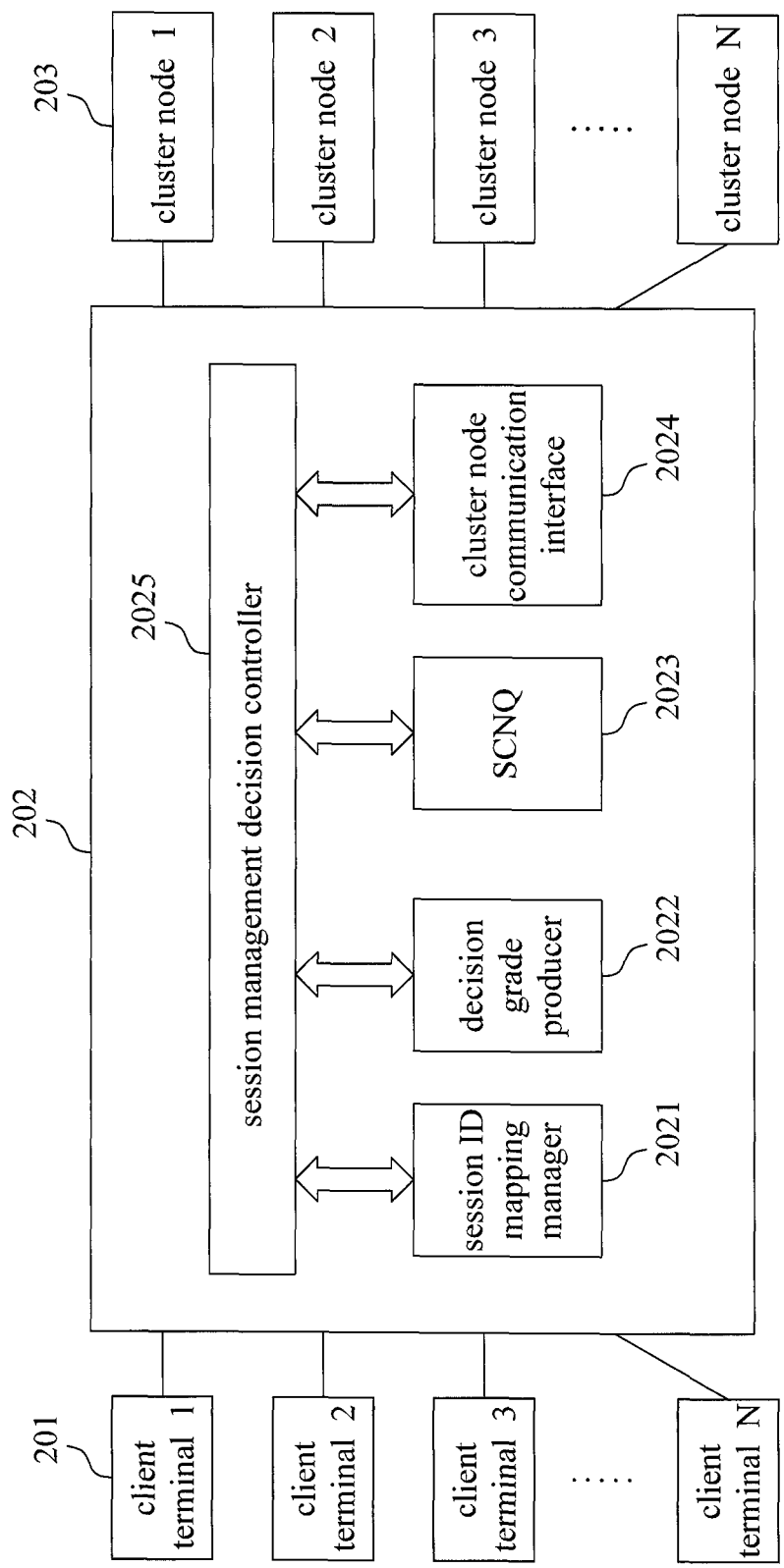
FIG. 2 shows a schematic view of a remote management system with adaptive session management mechanism of the present disclosure.

FIG. 2 shows a schematic view of the session management system architecture of the present disclosure, through an adaptive feedback session management decision (AFSMD) server 202 to connect one or more client terminals 201 and one or more cluster nodes 203. The AFSMD server 202 is a load-balancer server with adaptive session management capability, configured to execute load balance and receive connection request from the client terminals and forward the connection to a cluster node of remote management server based on load-balancing rule. In addition, the AFSMD server 202 performs session management by adaptive means.

The AFSMD server 202 includes a session ID map manager 2021, configured to record the mapping relation between sessions and the cluster nodes forwarded to, wherein the session ID mapping being stored in a session ID mapping table; a decision grade producer 2022, configured to produce a decision grade to determine a session management manner of a current session; a session connection number query (SCNQ) 2023, configured to communicate with a storage device and obtain a number of session connections of a client terminal; a cluster node communication interface 2024, configured to detect whether all cluster nodes operating normally, communicate with cluster nodes, forward a connection from a client terminal to a cluster node based on a load-balancing rule and obtain a session identification (ID), and inform cluster nodes whether to replicate content of the current session; and a session management decision controller 2025, connected to the session ID mapping manager 2021, session decision grade producer 2022, SCNQ 2023 and cluster mode communication interface 2024, configured to control entire decision flow of the session management, including an adaptive session management decision algorithm to dynamically determine different session management manner according to a decision grade produced by the decision grade producer, and to record the number of successes and failures of each cluster nodes for modifying a decision grade factor so as to achieve efficient management manner.

In addition, the session management decision controller 2025 controls the session ID mapping manager 2021 to obtain and record the session ID; the session management decision controller 2025 controls the decision grade producer 2022 to compute a replication decision grade RG, a random value R, a change ratio CR and a replication change ratio RCR; the session management decision controller 2025 controls the SCNQ 2023 to obtain a session connection number N and update a failure ration; the session management decision controller 2025 controls the cluster node communication interface 2024 to obtain whether the cluster node is in a normal state and forward a connection with a replication flag to a suitable cluster node.

It should be noted that the SCNQ 2023 can further either include a database configured to store the session connection number of each client terminal for storing information including a total connection number expected in next session of each client terminal, or use a proxy to connect to the database.

Figure 3:
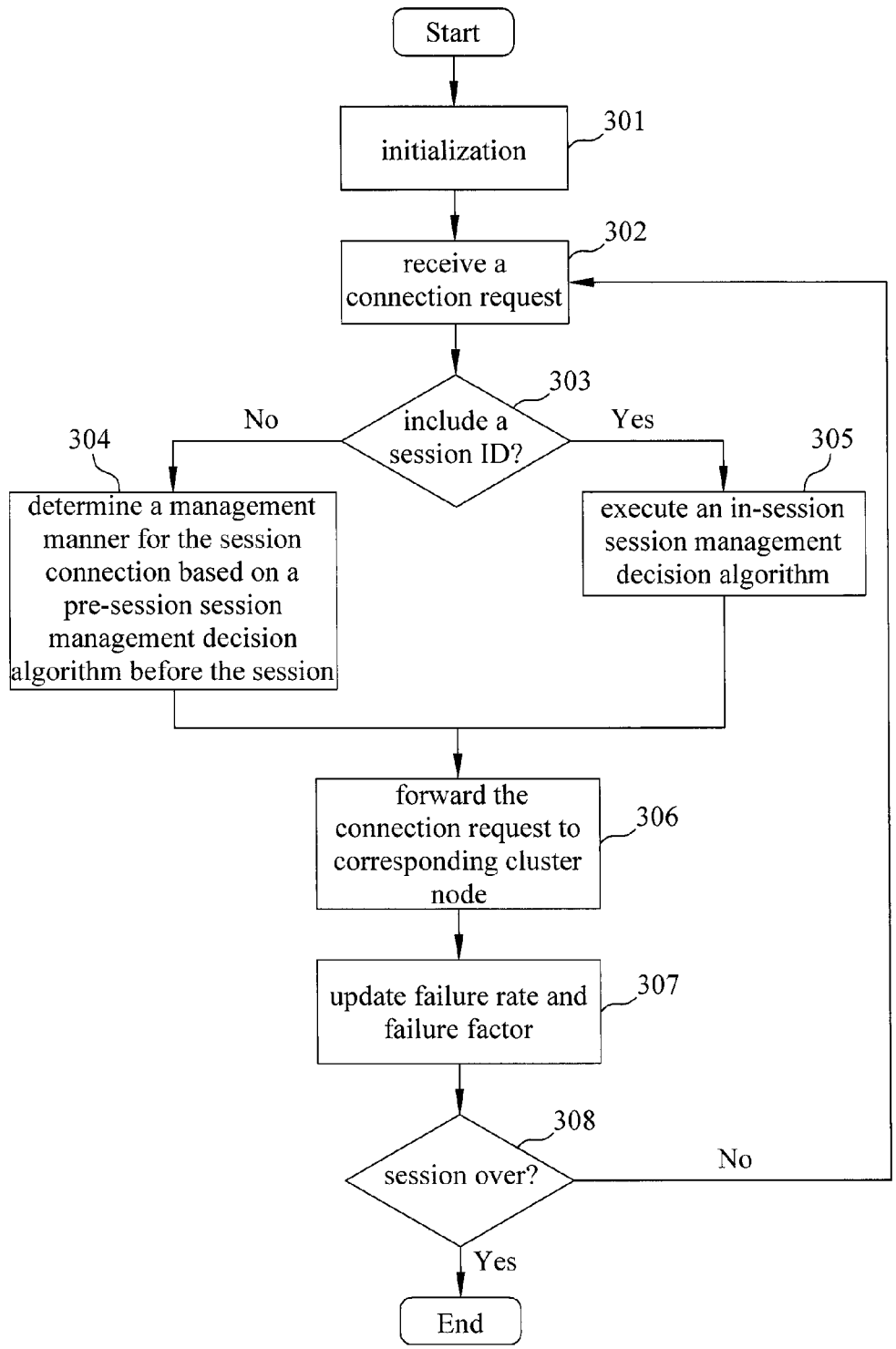
FIG. 3 shows a flowchart of a method of adaptive session management of the present invention.

FIG. 3 shows a method of adaptive session management, applicable to a session-based service system, the session-based service system including one or more client terminals and one or more cluster nodes. For example, the method can be executed on the AFSMD server 202 of FIG. 2.

As shown in FIG. 3, the method of adaptive session management includes the following steps. Step 301 is an initialization step, for example, assigning an initial value to a failure factor of a cluster node. In step 302, the system receives a connection request from a client terminal and inspects whether the connection request including a session ID data, as shown in step 303. Step 304 is to determine a management manner for the session connection based on a pre-session session management decision algorithm before the session when no session ID data is included; and step 305 is to execute an in-session session management decision algorithm to determine a management manner for subsequent session connections when session ID data is included. Step 305 is to, based on mapping session management manner in a session ID mapping manager, forward the connection request to corresponding cluster node for processing. Step 307 is to update failure rate and failure factor of the cluster node, and step 308 is to continue to receive a next connection request until all connection requests being over.

It should be noted that in step 303, the inspection of whether the connection request including a session ID data is to determine whether the connection request is a new session. Without the session ID data, a new session will be established; thus, step 304 is executed to determine a management manner for the session connection based on a pre-session session management decision algorithm before the session. On the other hand, for existing session, step 305 is taken to execute an in-session session management decision algorithm to determine a management manner for subsequent session connections. After executing step 304 or step 305, step 306 is executed to forward the connection request to a suitable cluster node for processing based on the session management manner decided in step 304 or step 305. The cluster node failure factor and failure ration of the cluster node in step 307 are parameters required for reference when performing adaptive session management of the present disclosure. Therefore, the parameters must be dynamically updated to maintain the accuracy of the parameters.

Figure 4:
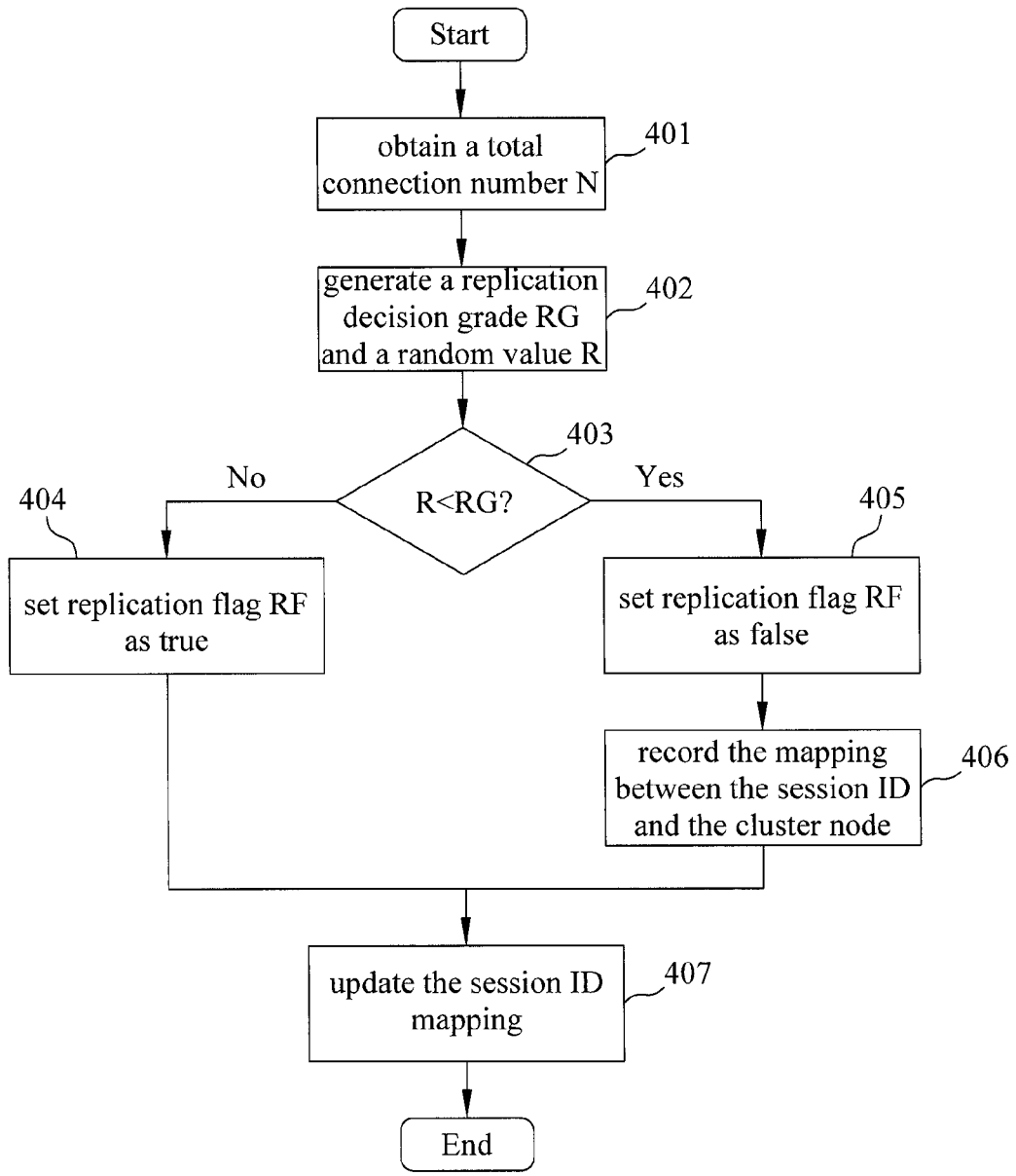
FIG. 4 shows a detailed flow of step 304 of FIG. 3 to determine a management manner for the session connection based on a pre-session session management decision algorithm before the session.

FIG. 4 shows a detailed flow of the step 304 to determine a management manner for the session connection based on a pre-session session management decision algorithm before the session. As shown in FIG. 4, step 401 is to obtain a total connection number N. That is, the total number of connections of this session. Step 402 is to generate a replication decision grade RG and a random value R. In other words, a replication decision grade RG is generated based on total connection number N and cluster node failure factor $F_{CNC}$, and a random number R between 0 and 1 is also generated randomly. Step 403 is to determine whether R is less than the replication decision grade RG. When R<RG, step 405 is executed to set a replication flag RF as false and step 406 is executed to record the mapping between the session ID and the cluster node. On the other hand, when R≥RG, step 404 is executed to set a replication flag RF as true. After step 404 or step 406, step 407 is executed to update the session ID mapping and terminate the process of determining a management manner for the session connection based on a pre-session session management decision algorithm before the session, in other words, step 304 of FIG. 3.

It should be noted that in step 402 of generating a replication decision grade RG based on total connection number N and cluster node failure factor $F_{CNC}$, and randomly generating a random number R between 0 and 1, the replication decision grade RG is inversely proportional to the cluster node failure factor $F_{CNC}$, and is proportional to the square of the N. Step 403 is to determine whether R is less than RG. Therefore, in the present flow, the decision whether to replicate the session to other cluster nodes will be affected by the total connection number N.

Figure 5:
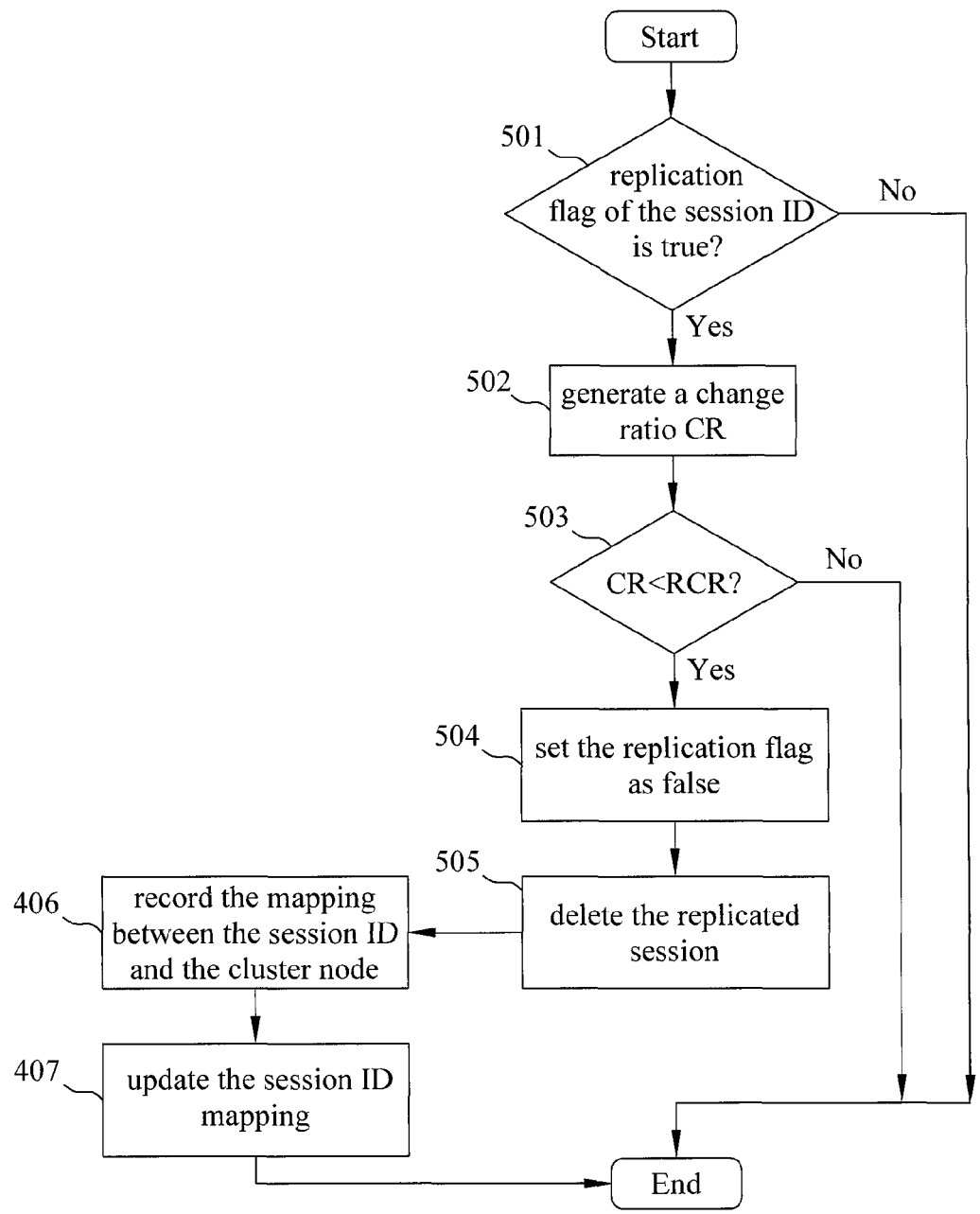
FIG. 5 shows a detailed flow of step 305 of FIG. 3 to execute an in-session session management decision algorithm to determine a management manner for subsequent session connections.

FIG. 5 shows a detailed flow of the step 305 of FIG. 3 to forward the connection request to corresponding cluster node for processing based on mapping session management manner in a session ID mapping manager. As shown in FIG. 5, step 501 is to determine whether the replication flag of the session ID is true. When the replication flag of the session ID is true, step 502 is executed to generate a change ratio CR and generate a replication change ration RCR between 0 and 1; wherein the CR value is proportional to the $F_{CNC}$ and has a mean distribution mapping relation with the total connection number N. When the replication flag of the session ID is false, the process (i.e., step 305) is terminated. Step 503 is to compare CR and RCR. When CR<RCR, step 504 is executed to set the replication flag as false; otherwise, the process (i.e., step 305) is terminated. Step 505 is to delete the replicated session. In other words, the replications of the session on the other cluster nodes are deleted, and mapping of the session ID and the cluster node is recorded and updated. Then, the process moves on to step 406 of FIG. 4 to record the mapping of the session ID and cluster node.

Figure 6:
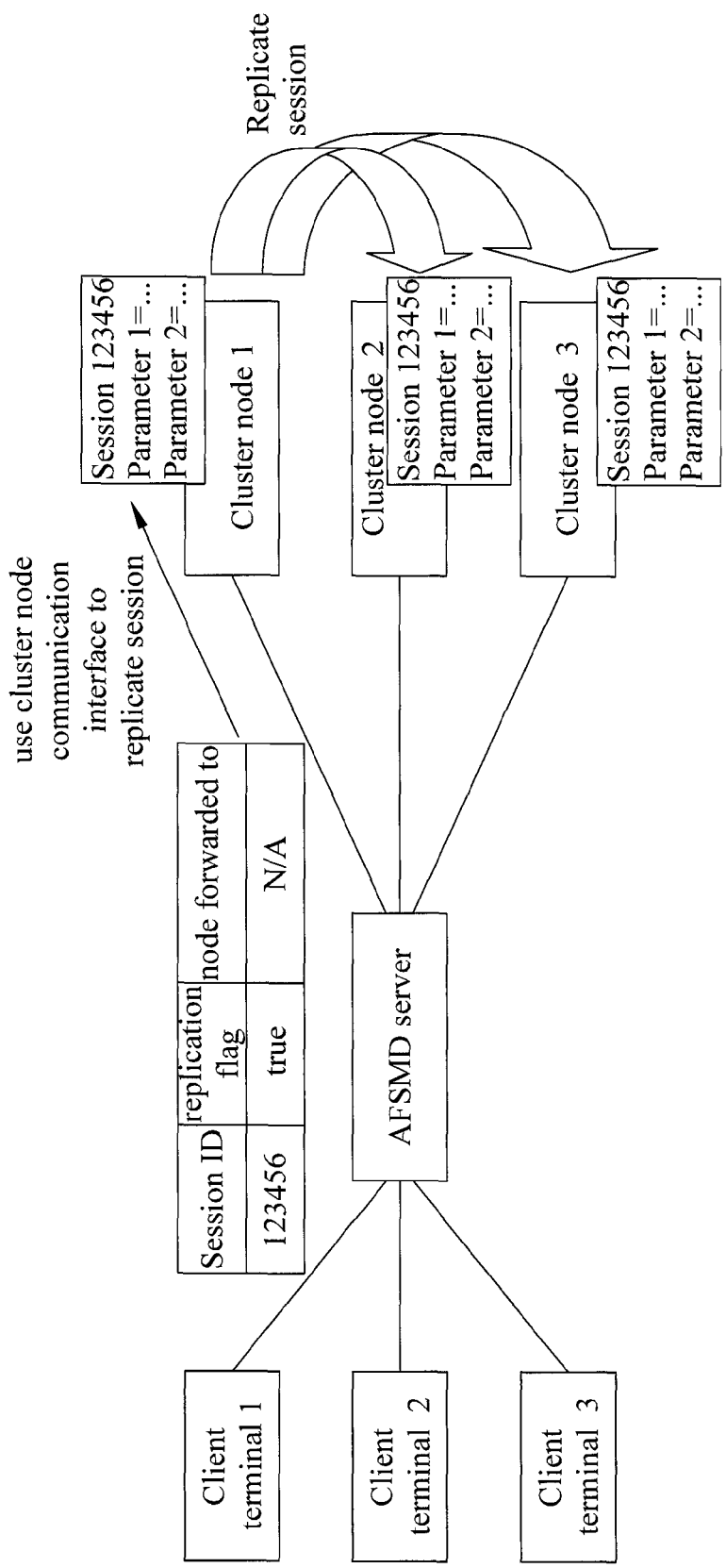
FIG. 6 shows a schematic view of an embodiment of the detailed flow in FIG. 4.

FIG. 6 shows a schematic view of an embodiment of the detailed flow of FIG. 4. As aforementioned, the decision of replication of session to other cluster nodes depends on the total connection number N. When N is a larger value, the AFSMD server 202 establishes a mapping between session ID and cluster node based on the connection request of the client terminal, for example, the session ID is 123456, sets the replication flag as true and sets the node forwarded to as N/A. The AFSMD server 202 also uses cluster node to replicate the session to a plurality of cluster nodes, for example, in the present embodiment, session 123456 is replicated to three other cluster nodes, including cluster node 1, cluster node 2 and cluster node 3.

Figure 7:
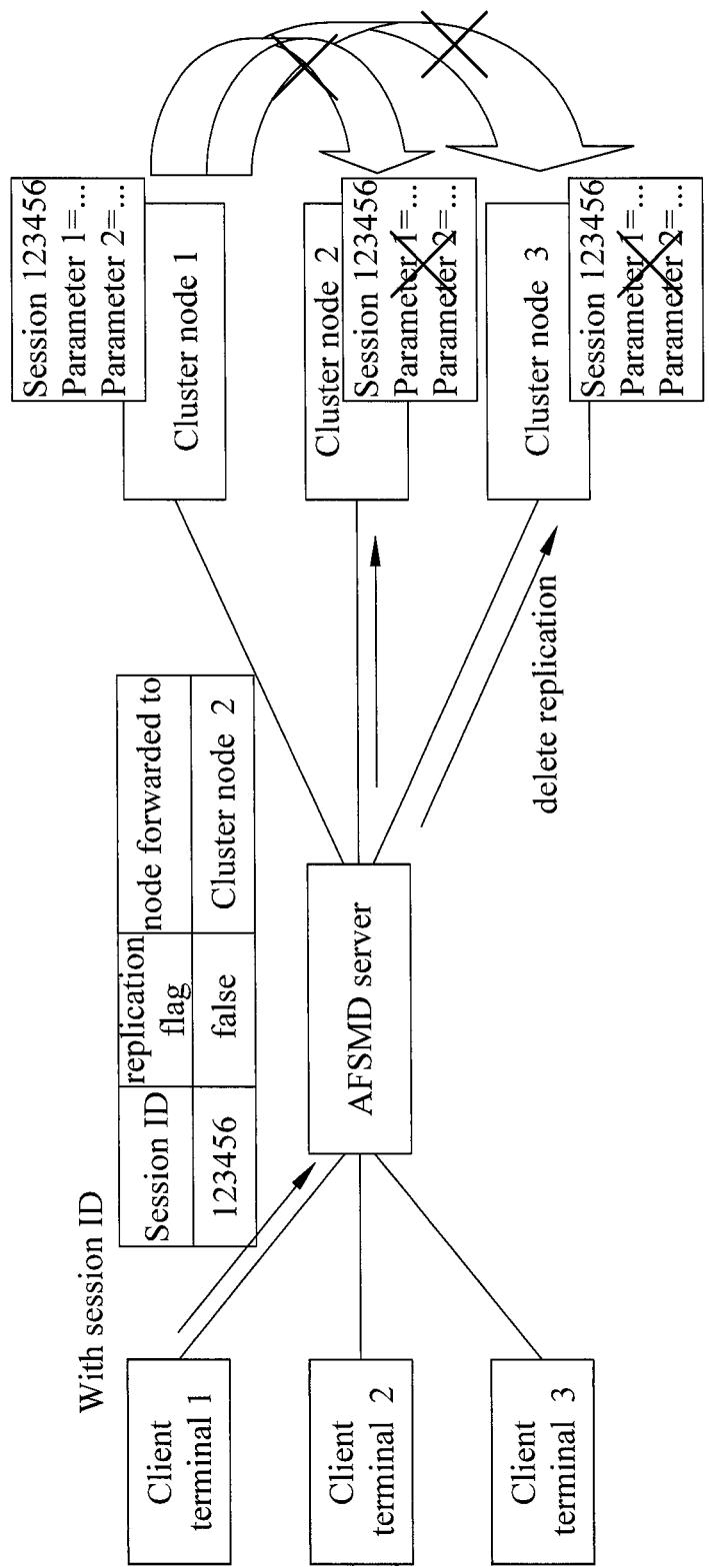
FIG. 7 shows a schematic view of an embodiment of the detailed flow in FIG. 5.

FIG. 7 shows a schematic view of an embodiment of the detailed flow of FIG. 5. As shown in FIG. 7, after receiving connection request with session ID 123456, step 503 is executed and CR is less than RCR. Therefore, step 504 is executed to set replication flag as false and step 505 is executed to delete replicated sessions on the other cluster nodes, record mapping of the session ID and cluster nodes, and update session ID mapping. That is, the node forwarded to is updated to cluster node 1.

According to the adaptive session management system of the present disclosure, simulations are conducted to evaluate the performance to show that the algorithm of the present disclosure performs better regarding the memory and time consumption under different failure ratio of the cluster nodes. The simulation parameters are determined according to the observation of the actual network environment and reference to Broadband Forum TR-069 session management operation mode. The actual simulation parameters are as follow:
Number of client terminals: 10,000;
Number of cluster nodes: 1,000;
Number of remote management tasks: 5,000,000;
Bases for generating session number: Gaussian distribution with mean=17, std=3;
Failure ration of cluster node: 0.1%-5%;
Simulation time parameter:
Time for each connection: Gaussian distribution with mean=100, std=20, unit=ms;
Time for establishing each session: Gaussian distribution with mean=1000, std=200, unit=ms;
Time for establishing each replicated session: Gaussian distribution with mean=100, std=20, unit=ms;
Memory for each session information: Gaussian distribution with mean=200, std=50, unit=byte.

In addition, for the algorithm of adaptive session management decision, the simulation uses the following parameters:
FR update: FR=number of failure/total connection number;
Fc$_{CNC}$ update: $F_{CNC}$=(previous $F_{CNC}$+FR)/2;
Generation of RG, CR:

$$RG = \begin{cases} (1 - F_{CNC})\text{pow } N & \text{if } F_{CNC} >= 0.03 \\ (1 - F_{CNC})\text{pow } N/v, & \text{where } v = 0.06/F_{CNC} \text{ if } F_{CNC} < 0.03 \end{cases}$$

$$CR = F_{CNC}/Y,$$

where $$Y = \frac{1}{\delta\sqrt{2\pi}} e^{\frac{-(n-\frac{N}{2})^2}{\delta^2}}$$

and δ=N/3, N is the serial number of the current connection.

Wherein the simulation the base for generating random number is: random number generated by next Double and next Gaussian of the JAVA Random object.

Figure 8:
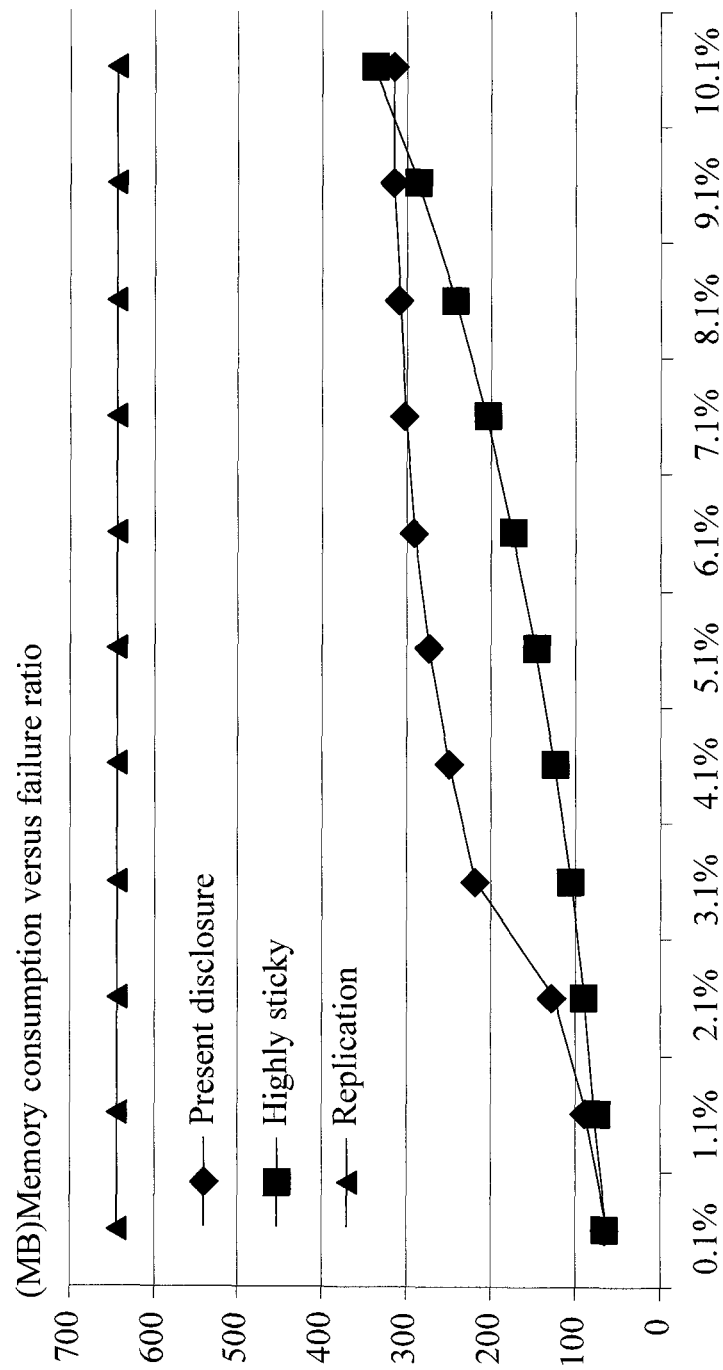
FIG. 8 shows a diagram of the memory consumption versus failure ratio in the simulation of the present disclosure.

FIG. 8 shows a diagram of the memory consumption versus failure ratio in the simulation of the present disclosure. As shown in FIG. 8, the known multi-point replication session management mechanism maintains constant memory consumption regardless of the failure ration because a fixed replication mechanism is employed. On the other hand, the known highly sticky session management mechanism has lower memory consumption when the cluster node failure ration is less than 1.1%, but the memory consumption increases greatly as the cluster node failure ration increases. The memory consumption of the adaptive mechanism of the present disclosure, however, shows a slow growth as the cluster node failure ration increases. Further, when the cluster node failure ration is close to 9%, the memory consumption using the adaptive session management mechanism outperforms the known highly sticky session management mechanism.

Figure 9:
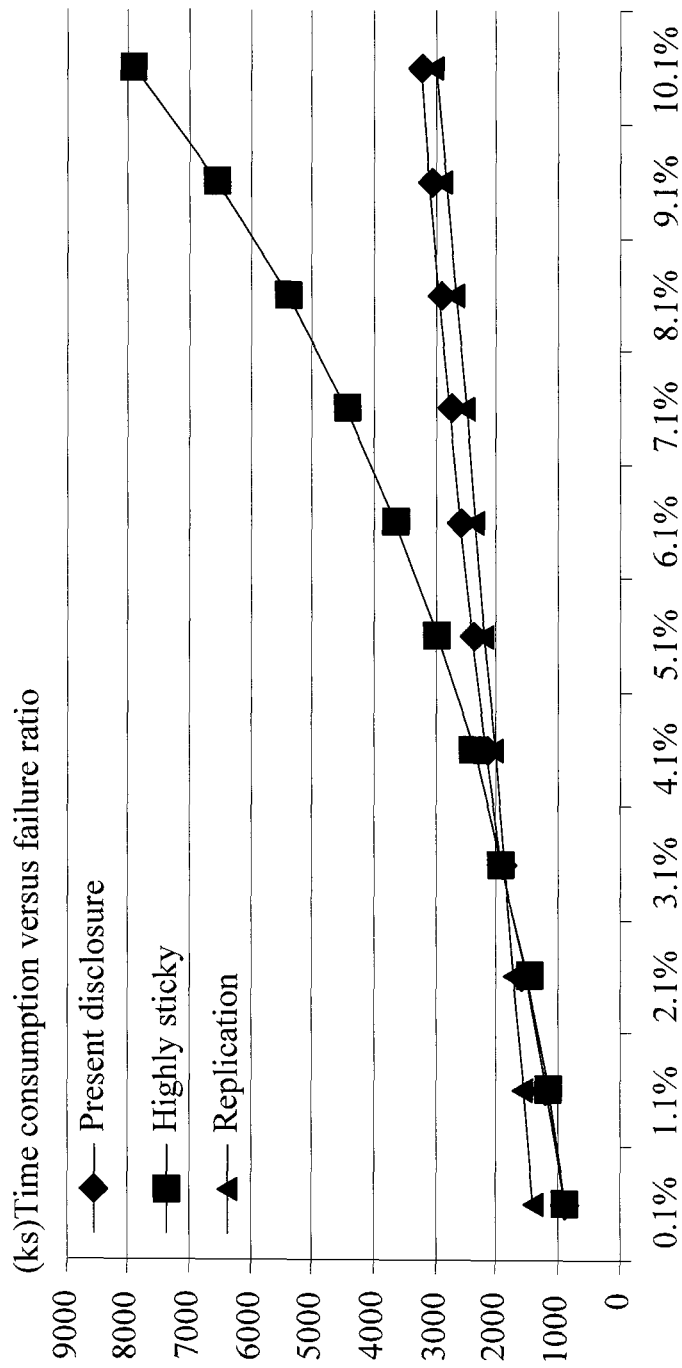
FIG. 9 shows a diagram of the time consumption versus failure ratio in the simulation of the present disclosure.

FIG. 9 shows a diagram of the time consumption versus failure ratio in the simulation of the present disclosure. As shown in FIG. 9, the time consumption using the known highly sticky session management mechanism increases greatly as the cluster node failure ration increases. The time consumption using the adaptive mechanism of the present disclosure and the known multi-point replication session management mechanism, however, shows a slow growth as the cluster node failure ration increases. Further, the adaptive session management mechanism outperforms the known multi-point replication session management mechanism when the failure ratio is low.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A remote management system with adaptive session management mechanism, comprising:
    at least a client terminal;
    at least a cluster node; and
    an adaptive feedback session management decision (AFSMD) server, connected to the at least a client terminal and the at least one cluster node;
    the AFSMD server further comprising:
    a session identification (ID) map manager, configured to record a mapping relation between sessions and the cluster nodes forwarded to;
    a decision grade producer, configured to produce a decision grade to determine a session management manner of a current session;
    a session connection number query (SCNQ), configured to communicate with a storage device and obtain a number of session connections of a client terminal;
    a cluster node communication interface, configured to detect whether all cluster nodes are operating normally, communicate with the cluster nodes, forward a connection from the client terminal to a cluster node based on a load-balancing rule and obtain a session ID, and inform the cluster nodes whether to replicate content of the current session; and
    a session management decision controller, connected to the session ID mapping manager, session decision grade producer, SCNQ and cluster node communication interface, configured to control entire the decision flow of the session management, including an adaptive session management decision algorithm to dynamically determine a different session management manner according to a decision grade produced by the decision grade producer, and to record a number of successes and failures of each cluster node for modifying a decision grade factor.

2. The remote management system with adaptive session management mechanism as claimed in claim 1, wherein the session management decision controller controls the session ID mapping manager to obtain and record the session ID; the session management decision controller controls the decision grade producer to compute a replication decision grade RG, a random value R, a change ratio CR and a replication change ratio RCR; the session management decision controller controls the SCNQ to obtain a session connection number N and update a failure ration; and the session management decision controller controls the cluster node communication interface to obtain whether the cluster node is in a normal state and forward a connection with a replication flag to a suitable cluster node.

3. The remote management system with adaptive session management mechanism as claimed in claim 2, wherein the SCNQ further comprises a database configured to store the session connection number of each client terminal for storing information including a total connection number expected in next session of each client terminal.

4. The remote management system with adaptive session management mechanism as claimed in claim 2, wherein the SCNQ further uses a proxy to connect to a database configured to store the session connection number of each client terminal for storing information including a total connection number expected in next session of each client terminal.

5. A method of adaptive session management, executable on an adaptive feedback session management decision (AFSMD) server, applicable to a session-based service system, the session-based service system comprising at least a client terminal and at least a cluster node, the method of adaptive session management comprising the following steps:
    assigning an initial value to a failure factor of a cluster node;
    the system receiving a connection request from a client terminal and inspecting whether the connection request including a session ID data;
    determining a management manner for the session connection based on a pre-session session management decision algorithm before the session when no session ID data being included;
    executing an in-session session management decision algorithm to determine a management manner for subsequent session connections when session ID data being included;
    based on mapping session management manner in a session ID mapping manager, forwarding the connection request to a corresponding cluster node for processing; and
    updating failure ratio and failure factor of the cluster node, and continuing to receive a next connection request until all connection requests being over;
    wherein the at least a client terminal using the decision apparatus of adaptive feedback session management indirectly to establish connection with the at least one cluster node; the decision apparatus of adaptive feedback session management being configured to distributing connection request from the at least a client terminal to the at least one cluster node, and returning the execution result from the at least one cluster node to the at least a client terminal for performing session management.

6. The method of adaptive session management as claimed in claim 5, wherein the step to determine a management manner for the session connection based on a pre-session session management decision algorithm before the session further comprises the following steps:
    obtaining a total connection number N;
    generating a replication decision grade RG based on the total connection number N and the cluster node failure factor $F_{CNC}$, and randomly generating a random value R between 0 and 1;
    determining whether R is less than the replication decision grade RG;
    when R<RG, setting a replication flag RF as false and recording mapping between the session ID and the cluster node;
    when R≥RG, setting a replication flag RF as true; and updating session ID mapping.

7. The method of adaptive session management as claimed in claim 5, wherein the step to forward the connection request to corresponding cluster node for processing based on mapping session management manner in a session ID mapping manager further comprises the following steps:
  determining whether the replication flag of the session ID being true;
  when the replication flag of the session ID being true, generating a change ratio CR and generating a replication change ration RCR between 0 and 1;
  when the replication flag of the session ID being false, terminating the present process;
  determining whether CR<RCR;
  when CR<RCR, setting the replication flag as false;
  when CR≥RCR, terminating the present process; and
  deleting replicated session on the other cluster nodes, recording mapping of the session ID and the cluster node and updating session ID mapping, and recording the mapping of the session ID and cluster node.

8. The method of adaptive session management as claimed in claim 5, wherein the session ID is a unique ID established for each session.

9. The method of adaptive session management as claimed in claim 5, wherein a session ID mapping manager is configured to record mapping between a session and a cluster node being forwarded to.

10. The method of adaptive session management as claimed in claim 5, wherein the failure ratio is a ratio between a total number of failures and a total connection number.

11. The method of adaptive session management as claimed in claim 6, wherein the replication decision grade is reversely proportional to the cluster node failure factor $F_{CNC}$ and proportional to square of the total connection number N.

12. The method of adaptive session management as claimed in claim 7, wherein the CR value is proportional to the $F_{CNC}$ and has a mean distribution mapping relation with the total connection number N.

13. The method of adaptive session management as claimed in claim 6, wherein a true replication flag indicates that the session is replicated to other cluster nodes, and a false replication flag indicates that the session is not replicated to other cluster nodes.

14. A adaptive feedback session management decision (AFSMD) apparatus, able to connect to at least a client terminal and at least a cluster node, the AFSMD apparatus comprising:
  a session identification (ID) map manager, configured to record a mapping relation between sessions and the cluster nodes forwarded to;
  a decision grade producer, configured to produce a decision grade to determine a session management manner of a current session;
  a session connection number query (SCNQ), configured to communicate with a storage device and obtain a number of session connections of a client terminal;
  a cluster node communication interface, configured to detect whether all cluster nodes operating normally, communicate with cluster nodes, forward a connection from a client terminal to a cluster node based on a load-balancing rule and obtain a session ID, and inform cluster nodes whether to replicate content of the current session; and
  a session management decision controller, connected to the session ID mapping manager, session decision grade producer, SCNQ and cluster node communication interface, configured to control entire decision flow of the session management, including an adaptive session management decision algorithm to dynamically determine different session management manner according to a decision grade produced by the decision grade producer, and to record the number of successes and failures of each cluster nodes for modifying a decision grade factor.

15. The AFSMD apparatus as claimed in claim 14, wherein the session management decision controller controls the session ID mapping manager to obtain and record the session ID; the session management decision controller controls the decision grade producer to compute a replication decision grade RG, a random value R, a change ratio CR and a replication change ratio RCR; the session management decision controller controls the SCNQ to obtain a session connection number N and update a failure ratio; and the session management decision controller controls the cluster node communication interface to obtain whether the cluster node is in a normal state and forward a connection with a replication flag to a suitable cluster node.

16. The AFSMD apparatus as claimed in claim 15, wherein the SCNQ further comprises a database configured to store the session connection number of each client terminal for storing information including a total connection number expected in next session of each client terminal.

17. The AFSMD apparatus as claimed in claim 15, wherein the SCNQ further uses a proxy to connect to a database configured to store the session connection number of each client terminal for storing information including a total connection number expected in next session of each client terminal.

18. A method of adaptive session management, executable on an adaptive feedback session management decision (AFSMD) apparatus, the AFSMD apparatus being connected to at least a client terminal and at least a cluster node, the method of adaptive session management comprising the following steps:
  assigning an initial value to a failure factor of a cluster node;
  the system receiving a connection request from a client terminal and inspecting whether the connection request including a session ID data;
  determining a management manner for the session connection based on a pre-session session management decision algorithm before the session when no session ID data being included;
  executing an in-session session management decision algorithm to determine a management manner for subsequent session connections when session ID data being included;
  based on mapping session management manner in a session ID mapping manager, forwarding the connection request to corresponding cluster node for processing; and
  updating failure ratio and failure factor of the cluster node, and continuing to receive a next connection request until all connection requests being over;
  wherein the at least a client terminal using the decision apparatus of adaptive feedback session management indirectly to establish connection with the at least one cluster node; the decision apparatus of adaptive feedback session management being configured to distributing connection request from the at least a client terminal to the at least one cluster node, and returning the execution result from the at least one cluster node to the at least a client terminal for performing session management.

19. The method of adaptive session management as claimed in claim 18, wherein the step to determine a management manner for the session connection based on a pre-session session management decision algorithm before the session further comprises the following steps:

obtaining a total connection number N;
generating a replication decision grade RG based on total the connection number N and the cluster node failure factor $F_{CNC}$, and randomly generating a random value R between 0 and 1;
determining whether R is less than the replication decision grade RG;
when R<RG, setting a replication flag RF as false and recording mapping between the session ID and the cluster node;
when R≥RG, setting a replication flag RF as true; and
updating session ID mapping.

20. The method of adaptive session management as claimed in claim 18, wherein the step to forward the connection request to corresponding cluster node for processing based on mapping session management manner in a session ID mapping manager further comprises the following steps:
determining whether the replication flag of the session ID being true;
when the replication flag of the session ID being true, generating a change ratio CR and generating a replication change ration RCR between 0 and 1;
when the replication flag of the session ID being false, terminating the present process;
determining whether CR<RCR;
when CR<RCR, setting the replication flag as false;
when CR≥RCR, terminating the present process; and
deleting replicated session on the other cluster nodes, recording mapping of the session ID and the cluster node and updating session ID mapping, and recording the mapping of the session ID and cluster node.

21. The method of adaptive session management as claimed in claim 18, wherein the session ID is a unique ID established for each session.

22. The method of adaptive session management as claimed in claim 18, wherein a session ID mapping manager is configured to record mapping between a session and a cluster node being forwarded to.

23. The method of adaptive session management as claimed in claim 18, wherein the failure ratio is a ratio between a total number of failures and a total connection number.

24. The method of adaptive session management as claimed in claim 19, wherein the replication decision grade is reversely proportional to the cluster node failure factor $F_{CNC}$ and proportional to square of the total connection number N.

25. The method of adaptive session management as claimed in claim 20, wherein the CR value is proportional to the $F_{CNC}$ and has a mean distribution mapping relation with the total connection number N.

26. The method of adaptive session management as claimed in claim 19, wherein a true replication flag indicates that the session is replicated to other cluster node, and a false replication flag indicates that the session is not replicated to other cluster node.

* * * * *